United States Patent [19]
Kristensen et al.

[11] Patent Number: 5,716,142
[45] Date of Patent: Feb. 10, 1998

[54] RADIAL JOURNAL BEARING WITH SLIDE SHOE

[75] Inventors: Egon Kristensen; Hardy Peter Jepsen, both of Nordborg, Denmark

[73] Assignee: Danfoss A/S, Nordborg, Denmark

[21] Appl. No.: 656,186
[22] PCT Filed: Dec. 5, 1994
[86] PCT No.: PCT/DK94/00455
  § 371 Date: Jul. 24, 1996
  § 102(e) Date: Jul. 24, 1996
[87] PCT Pub. No.: WO95/16130
  PCT Pub. Date: Jun. 15, 1995

[30] Foreign Application Priority Data

Dec. 8, 1993 [DK] Denmark ............... 1372/93

[51] Int. Cl.⁶ ................................. F16C 32/06
[52] U.S. Cl. ......................... 384/119; 384/117
[58] Field of Search ................ 384/100, 114, 384/116, 117, 118, 119

[56] References Cited

U.S. PATENT DOCUMENTS

| | | | |
|---|---|---|---|
| 3,675,977 | 7/1972 | Arsenius et al. | 384/117 |
| 3,791,703 | 2/1974 | Ifield | 384/117 |
| 4,530,227 | 7/1985 | Schlatter et al. | 384/117 X |
| 4,540,221 | 9/1985 | Frazer | 384/119 X |
| 4,919,549 | 4/1990 | Lawson et al. | 384/119 X |

*Primary Examiner*—Thomas R. Hannon
*Attorney, Agent, or Firm*—Lee, Mann, Smith, McWilliams, Sweeney & Ohlson

[57] ABSTRACT

A radial journal bearing (5, 6) is indicated, with an interior bearing surface placed facing an exterior bearing surface, where one of the bearing surfaces comprises a slide shoe (7, 8), which has one end with a contact face loaded to contact against the other bearing surface, and where this end is movable in such a manner that the contact against the other bearing surface can be maintained by a relative displacement of the bearing surface at right angles to the direction of the load. Hereby it is achieved that the variation of the leakage between the slide shoe and the opposing bearing surface is essentially reduced, resulting in longer life and greater stability.

12 Claims, 3 Drawing Sheets

RADIAL JOURNAL BEARING WITH SLIDE SHOE

BACKGROUND OF THE INVENTION

The present invention relates to radial journal bearings with one or several slide shoes, each having an interior bearing surface opposed to an exterior bearing surface.

DESCRIPTION OF THE PRIOR ART

A slide shoe means typically a moving part, which is loaded to contact against a bearing surface, so that one end of it is in contact with the bearing surface with a suitable contact face. The contact face may comprise a pressure pocket, which is open towards the bearing surface, and which via channels in the slide shoe is imparted with a hydrostatic pressure. The hydrostatic pressure in the pressure pocket relieves the Contact pressure between the bearing surfaces.

A radial journal bearing of this type may be shaped like two circular, opposing bearing surfaces, which are in sliding contact with each other while rotating in relation to each other, and in which in one of the bearing surfaces one or several slide shoes are placed for hydrostatic relief of the bearing. However, one of the bearing surfaces of the radial journal bearing may also, as indicated according to U.S. Pat. No. 51.82.978 , consist exclusively of a number of slide shoes, which are arranged radially in relation to the opposed circular bearing surface.

The function of these types of bearings depends on a well defined hydrostatic pressure in the pressure pocket of the slide shoe for relieving the bearing surfaces, and it is therefore important that no variations occur in the leakage from the pressure pocket.

German Patent No. 29 32 583 shows a design where the slide shoe is placed radially sliding in a guide, and where under the slide shoe in the guide, hydraulic pressure can be applied to press the slide shoe to contact against a rotating bearing surface. This ensures that there will always be contact pressure between the contact face of the slide shoe and the rotating bearing surface, so that any displacements of the rotating bearing surface away from the slide shoe are prevented by displacements of the slide shoe in its guide.

BRIEF SUMMARY OF THE INVENTION

The intention of the present invention is to indicate a radial journal bearing with slide shoe and a slide shoe for such a radial journal bearing, which reduces the risk of variations of the leakage between the contact face of the slide shoe and the opposing bearing surface.

These variations of the leakages between the contact face of the slide shoe and the opposing bearing surface may arise at transverse displacement of the bearing surfaces in relation to each other, for example as a consequence of the friction between a shaft in one bearing liner causing the shaft to tend to run out of centre and up against its own direction of rotation along with the bearing liner, so that it ends up orbiting in the bearing against its direction of rotation.

It is an object of this invention to overcome these problems.

It is a further object of this invention to provide a radial journal bearing where the slide bearing can take up tilting of the bearing surfaces in relation to each other.

It is yet a further object of this invention to provide a radial journal bearing, where the entire slide shoe can tilt in its guide as a consequence of a clearance between the slide shoe and the guide. This embodiment is easy to install as well as cheap to produce.

It is still a further object of the invention to provide alternative, and suitable embodiments.

Depending on the application of the slide bearing, the slide shoes can be placed on the interior surface of the slide bearing or on the exterior one. For example, the slide shoes can be placed on the bearing surface where a permanent high load area can be defined.

The claims indicate special embodiments of radial journal bearings according to the present invention such as throttle channel for controlling the hydraulic pressure that is fed into the pressure pocket of the slide shoe.

The above mentioned advantages of the invention are considerable in particular in connection with bearings in water-hydraulic piston engines, because the water-based pressure medium can be used for hydraulic relief of the journal bearings in spite of its low viscosity. The reason is, that these journal bearings in water-hydraulic piston motors will most often be dimensioned with a larger bearing clearance than is normally the case with oil lubrication, because sufficient fluid flow through the bearing clearance is required for cooling the bearing surfaces.

Especially together with the throttle device it is achieved that the throttling causes the pressure in the pressure pocket and thereby the leakage to drop with increasing leakage flow, so that the leakage becomes self-stabilising, and can thereby be stabilised to an acceptable value.

DETAILED DESCRIPTION OF INVENTION

Figure 1:
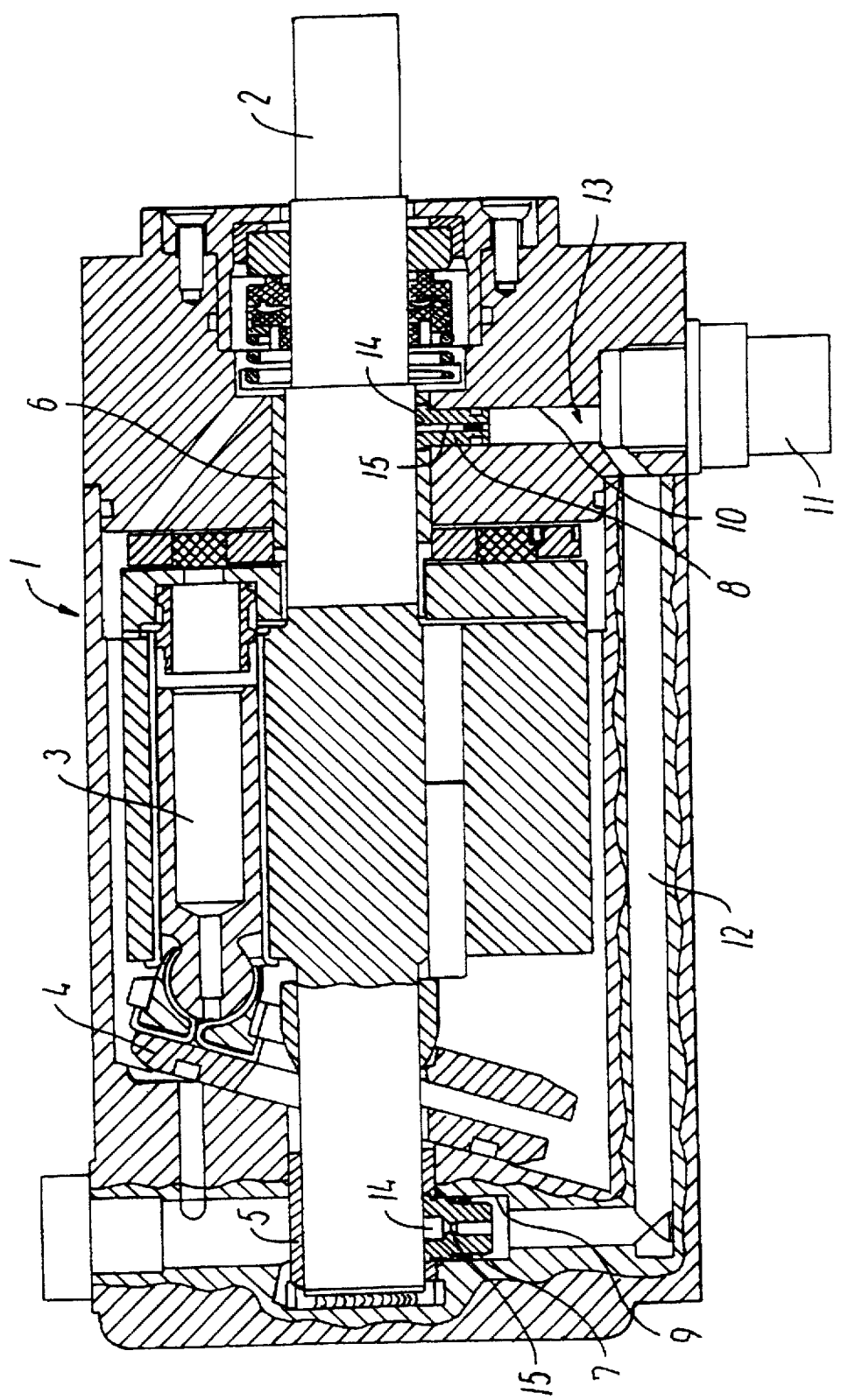
Figure 2:
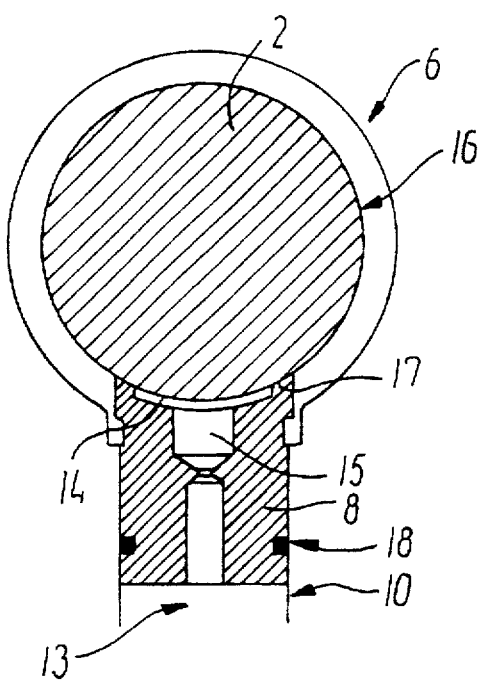
Figure 3:
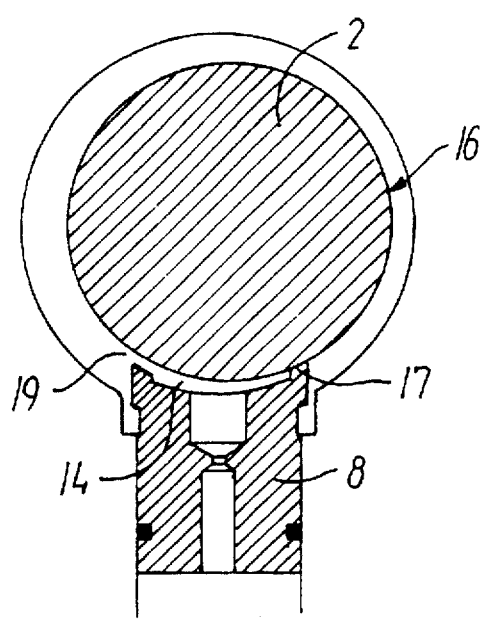
Figure 4:
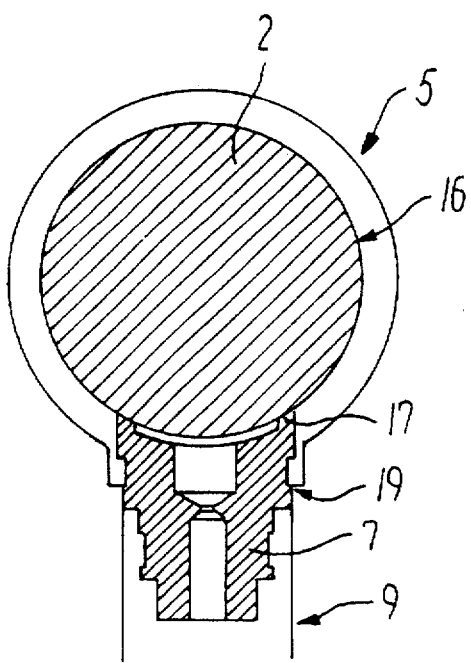
Figure 5:
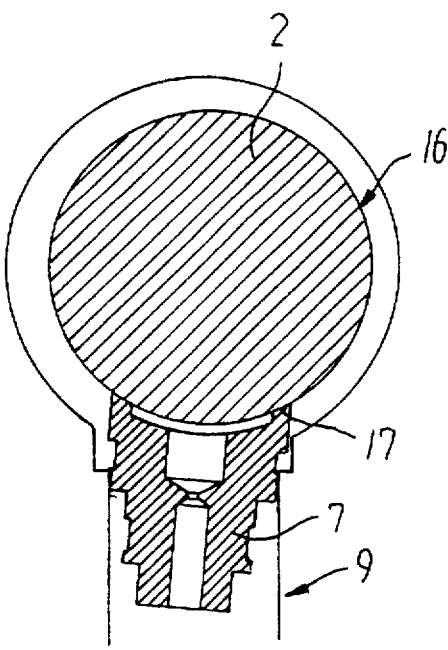
Figure 6:
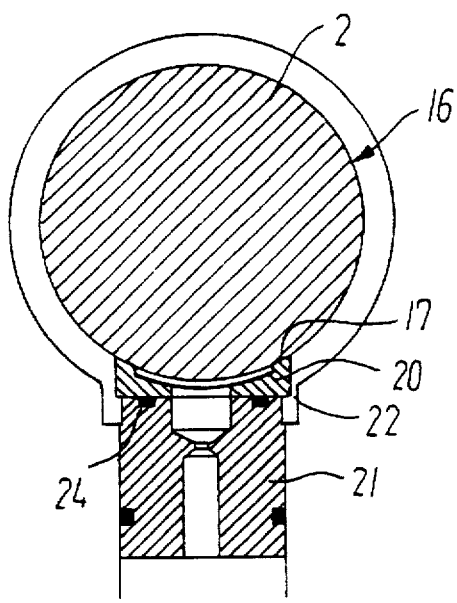
Figure 7:
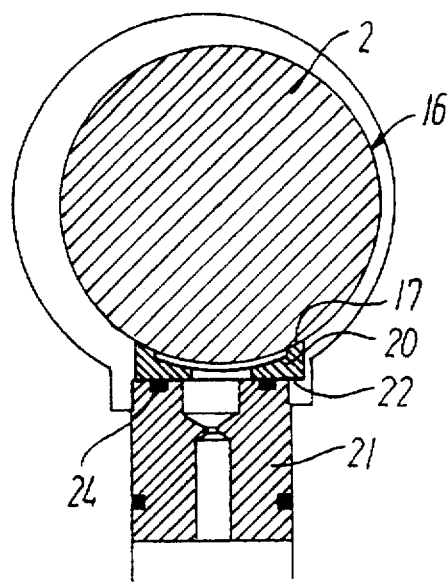
Figure 8:
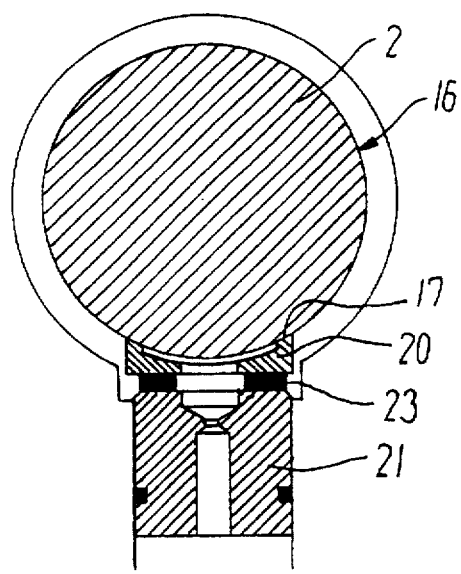
Figure 9:
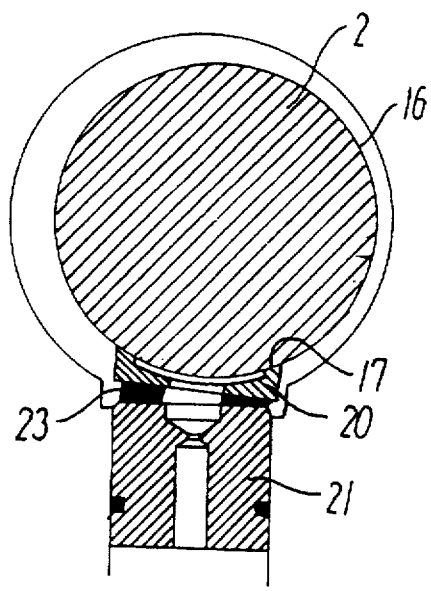

The invention is described in more detail in the following in embodiment types with reference to the drawing, where:

FIG. 1 shows a section of a hydraulic piston motor with a journal bearing according to known technology and a journal bearing according to the invention, FIG. 2 shows a principle drawing of a journal bearing according to known technology, FIG. 3 shows the journal bearing according to FIG. 2 with displaced bearing surfaces, FIG. 4 shows a principle drawing of an embodiment of a journal bearing according to the present invention, FIG. 5 shows the bearing according to FIG. 4 with displaced bearing surfaces, FIG. 6 shows a principle drawing of another embodiment of a bearing according to the invention, FIG. 7 shows the bearing according to FIG. 6 with displaced bearing surfaces, FIG. 8 shows a principle drawing of a third embodiment of a bearing according to the invention, FIG. 9 shows the bearing according to FIG. 8 with displaced bearing surfaces.

FIG. 1 shows an example of applying journal bearings with slide shoes in the form of an axial piston motor 1 with rotating shaft 2, which is driven by hydraulic pressure applied on a number of pistons 3, which are fastened to the shaft 2 and placed evenly spaced around the shaft 2. In the drawing only a piston 3 is shown. By means of a valve device the pistons are supplied with hydraulic pressure in such a manner that the pistons 3 press against the inclined disc 4 on one side of the shaft 2, which causes the shaft to rotate.

As shown in the drawing, the shaft 2 is suspended in two places in the journal bearings 5, 6, which are provided with slide shoes 7, 8. The journal bearing 6 is provided with a conventional slide shoe 8 in the guide 10, and the journal bearing 5 is provided with a slide shoe 7 in the guide 9. According to the present invention, the slide shoe 7 is designed in such a manner, that it can tilt in the guide 9.

The slide shoes 7, 8 are supplied with a hydrostatic pressure from the connector 11 via channels 12, 13. Thereby the hydraulic pressure, which is built up in the pressure pockets of the slide shoes 14 via the channels 15 in the slide shoes, will relieve the contact pressure in the journal bearings 5, 6. If the connector 11 feeds also the pistons 3 with pressure medium, a proportional relation will be achieved between the motor load and the relief provided to the journal bearings 5, 6 via the slide shoes 7, 8.

The bearing according to known technology 6 with the slide shoe 8 is shown in principle and enlarged in FIG. 2, where the shaft 2 with the bearing surface 16 is in contact with the contact face 17 of the slide shoe 8, which defines the pressure pocket 14. As mentioned before, the pressure pocket 14 is supplied with hydraulic pressure via the channel 13 and the channel in the slide shoe 15. Hereby the slide shoe 8 is displaced in the guide 10, so that it provides firm contact against the bearing surface 16. The slide shoe 6 is shown in the drawing with a sealing ring 18, which forms a seal between the slide shoe 8 and the guide 10.

In FIG. 3 it is then shown what may happen with the bearing shown in FIG. 2, if the shaft 2 with the bearing surface 16 moves out of the centre of the bearing, because this causes a leakage 19 at the contact face 17 of the slide shoe 8. Hereby a large part of the pressure in the pressure pocket 14 is lost, whereby the relief of the slide shoe 8 on bearing 5 is reduced.

According to the present invention this is remedied by giving the contact face 17 freedom to follow the movement of the bearing surface 16 out of center, which is the case according to the bearing 5, as shown in FIG. 1, which is shown in principle enlarged in FIG. 4 and 5. Here the slide shoe 7 has an annular contact 19 against the guide 9 of a very small size, and there is a small, well-defined slot between the annular contact face 19 and the guide 9, so that the slide shoe 7 is allowed to tilt in the guide 9, as illustrated in FIG. 5. Thereby the contact face 17 can follow the movement of the bearing surface 16 out of center, as seen in the figure.

It is clear that the basic idea of the present invention may be varied in countless more or less suitable embodiments, depending on the bearing situation with which it is used. The FIGS. 6 and 8 show alternative, fundamental embodiments, where the slide shoe is divided into two main parts, namely the upper part 20, which is movably supported in relation to the lower part 20, so that the upper part 20 with the contact face 17 can follow the bearing surface 16 on the shaft 2, as shown in the corresponding FIGS. 7, 9.

According to FIG. 6 the upper part 20 is supported in a slide guide 22 in relation to the lower part 21, which slide guide is sealed with a sealing ring 24.

FIG. 8 shows an elastic ring 23, which is placed between the upper part 20 and the lower part 21.

The embodiments shown shall be seen only as normative examples in connection with the sample of application shown in FIG. 1. Thus, in other fields of application, the slide shoes can be placed in the shaft instead of in the bearing liner, and the number of slide shoes and their design can be freely chosen, depending on the actual purpose.

The effect of the present invention is considerable, especially in connection with pressure media of low viscosity, such as water-based pressure media, but it can also be used with advantage in connection with pressure media with high viscosity.

We claim:

1. A radial journal bearing for use in hydraulic motors with an interior bearing surface situated opposed to an exterior bearing surface, in which one of the bearing surfaces comprises a slide shoe having at one end a contact face loaded towards contact against the other bearing surface, and in which said one end is movable in such a manner that the contact against the other bearing surface is maintained by a relative displacement between the bearing surfaces at right angles to the direction of load on the bearing surfaces, said slide shoe being supplied with a hydrostatic pressure via a pressure medium by communication with one or more channels said one or more channels being in communication with one or more pistons in the hydraulic motor.

2. A radial journal bearing according to claim 1, in which said one end is movable in such a manner that the contact against the other bearing surface is further maintained by tilting of the bearing surfaces in relation to each other.

3. A radial journal bearing according to claim 1, in which the slide shoe is slidingly supported in a guide, and including a clearance between the slide shoe and the guide, such that the slide shoe can tilt.

4. A radial journal bearing according to claim 1, in which the slide shoe comprises two parts, one part of which supports the first end and is slidingly supported in relation to the second part.

5. A radial journal bearing according to claim 4, including an elastic element located between the two parts.

6. A radial journal bearing according to claim 5, in which the part with the first end is tangentially movable in relation to the second part.

7. A radial journal bearing according to claim 1, in which the slide shoe constitutes at least a part of the interior bearing surface.

8. A radial journal bearing according to claim 1, in which the slide shoe constitutes at least a part of the exterior bearing surface.

9. A radial journal bearing according to claim 1, in which the contact face comprises a rest surrounding a recess.

10. A radial journal bearing according to claim 9, in which the load is applied as a hydraulic pressure, and the pressure is applied on the recess.

11. A radial journal bearing according to claim 1, in which the load is applied as a hydraulic pressure.

12. A radial journal bearing according to claim 10, in which the hydraulic pressure is applied on the recess via a throttle channel.

* * * * *